Dec. 22, 1953
C. W. TOOLE
COTTON PICKER
2,663,136
Filed Nov. 19, 1951
4 Sheets-Sheet 1
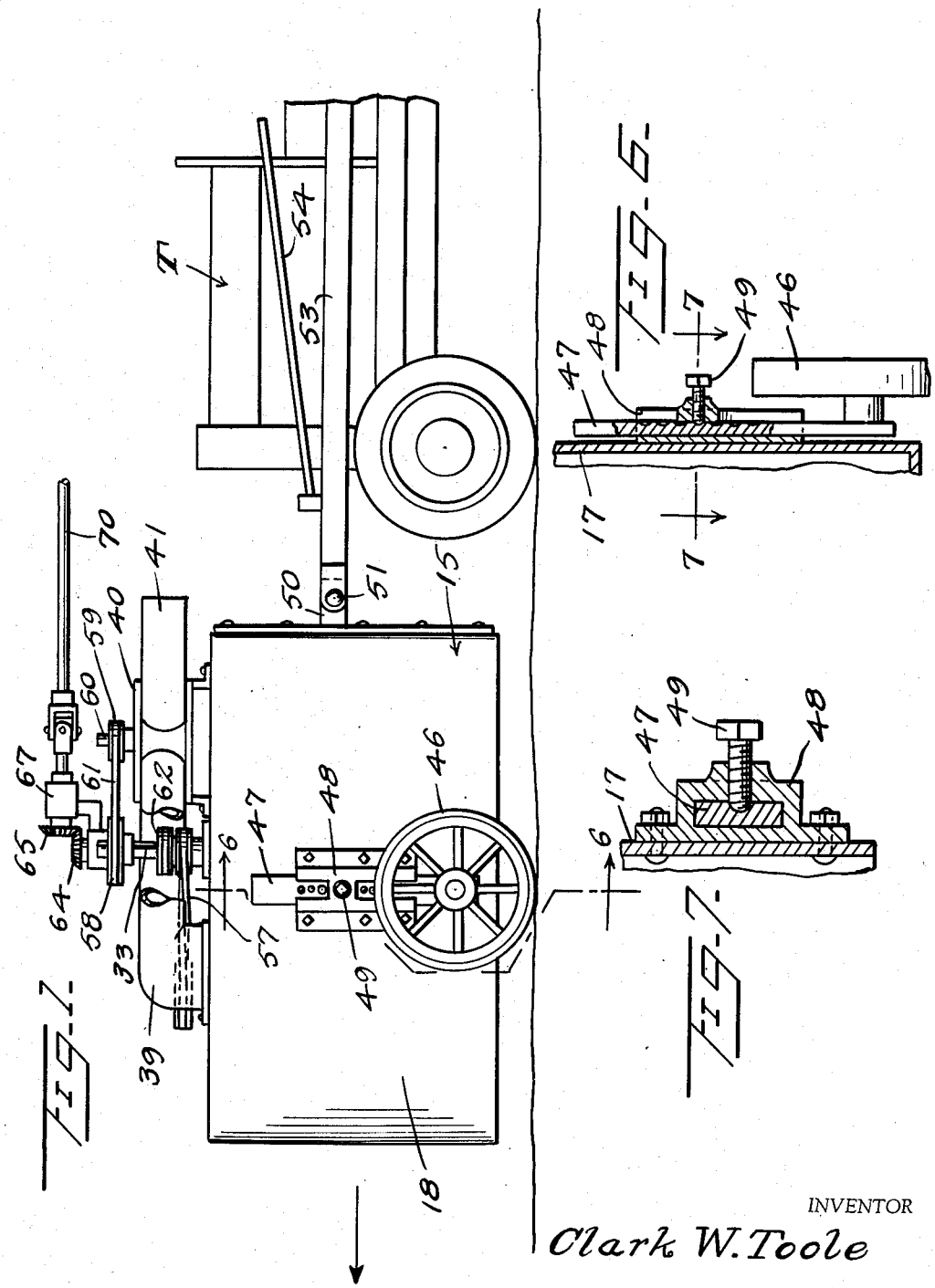
INVENTOR
Clark W. Toole
BY Kimmel & Carowell
ATTORNEYS

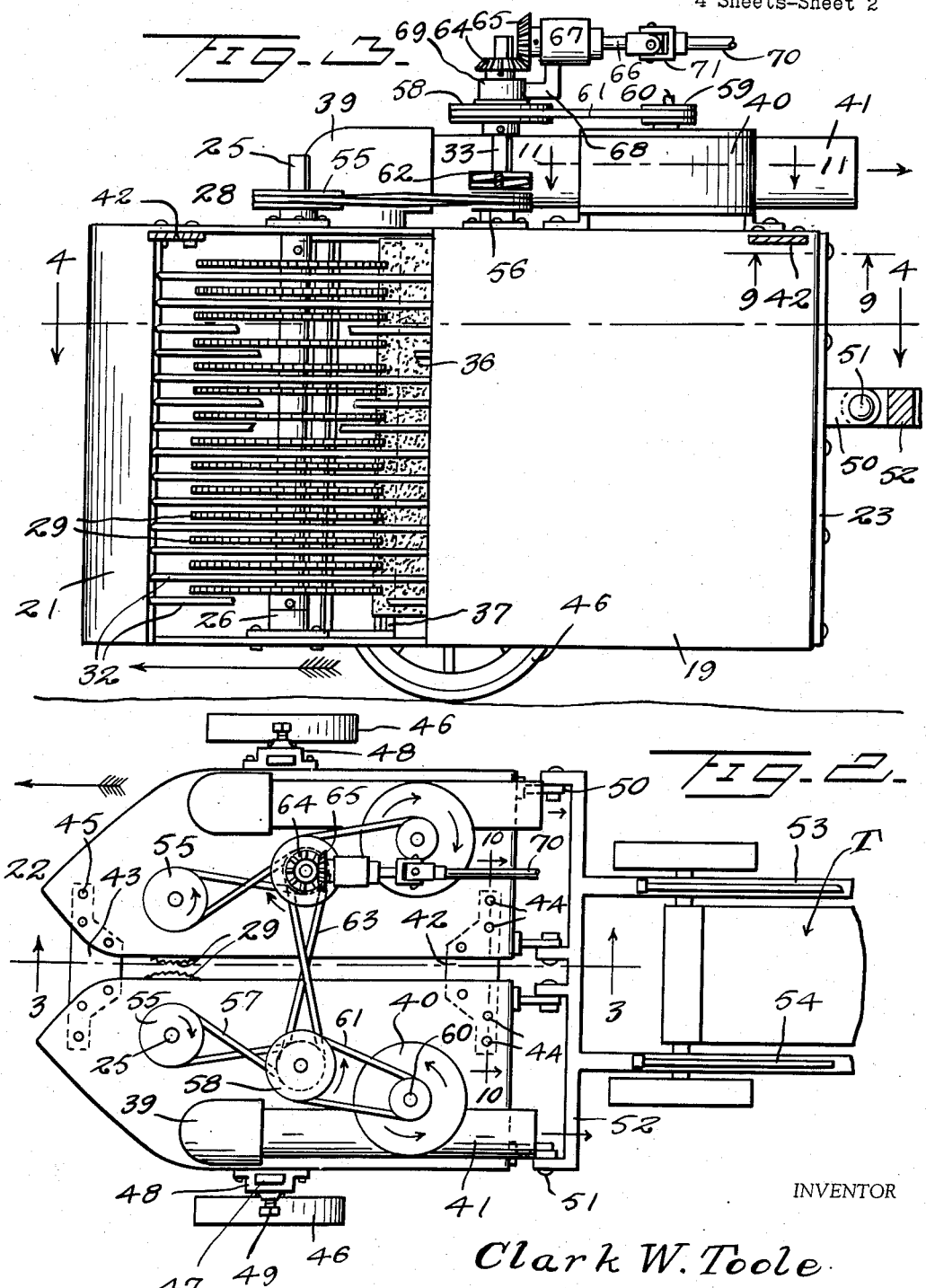

Dec. 22, 1953 C. W. TOOLE 2,663,136
COTTON PICKER
Filed Nov. 19, 1951 4 Sheets-Sheet 3
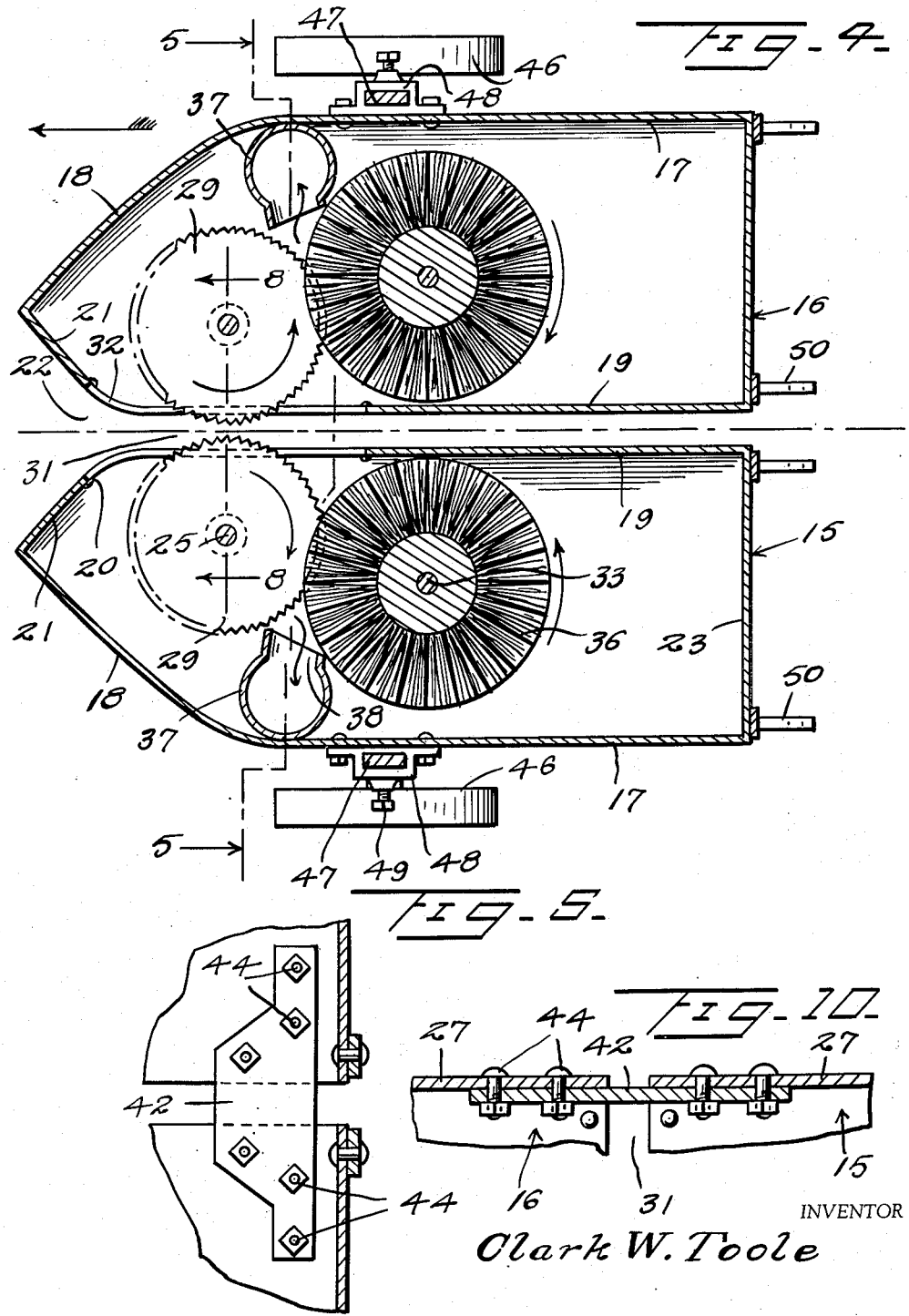
INVENTOR
Clark W. Toole
BY Kimmel & Crowell
ATTORNEYS Dec. 22, 1953 C. W. TOOLE 2,663,136
COTTON PICKER
Filed Nov. 19, 1951 4 Sheets-Sheet 4
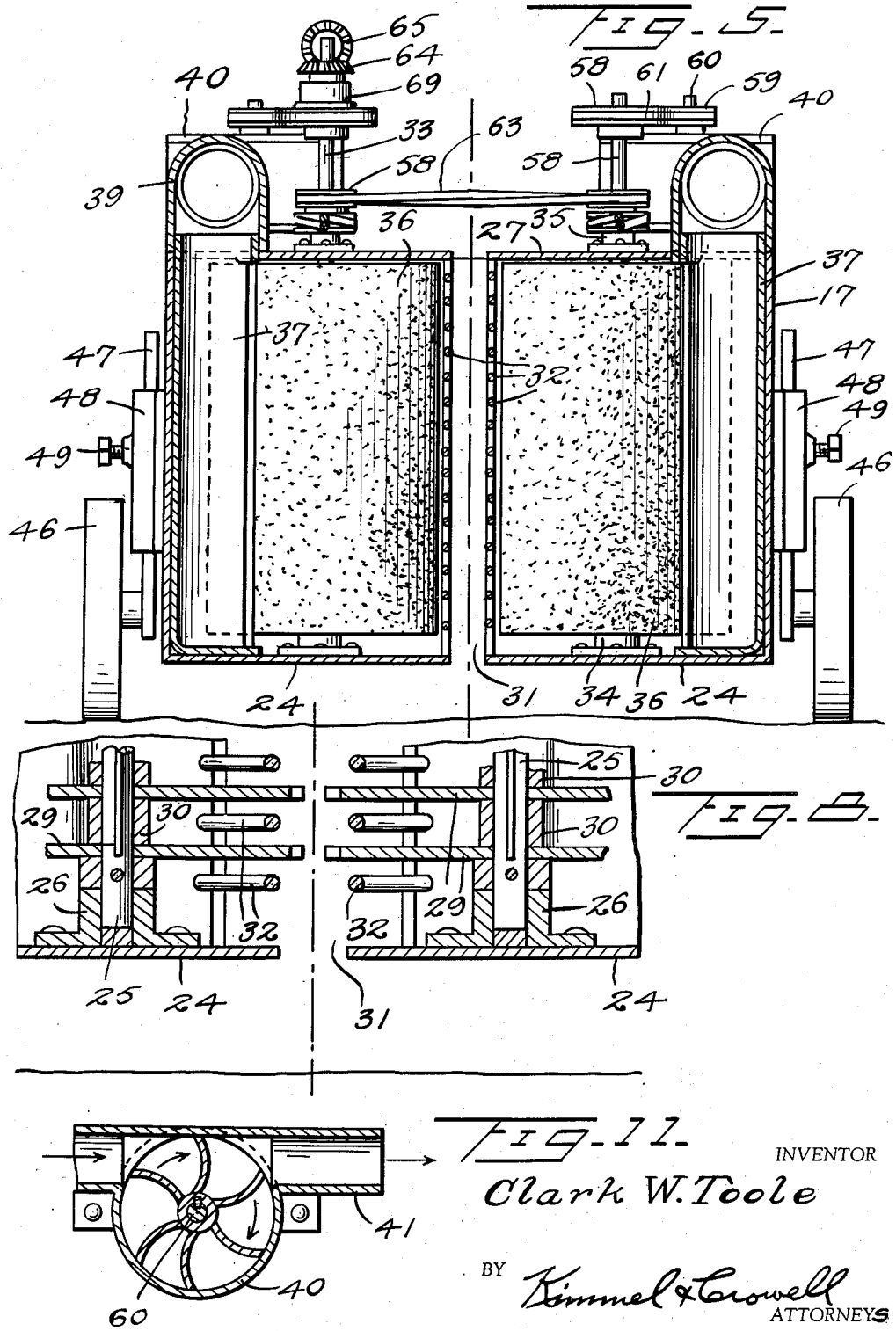
INVENTOR
Clark W. Toole
BY
Kimmel & Crowell
ATTORNEYS Patented Dec. 22, 1953

2,663,136

UNITED STATES PATENT OFFICE 2,663,136

COTTON PICKER

Clark Walter Toole, Jacksonville, Fla.

Application November 19, 1951, Serial No. 257,045

4 Claims. (Cl. 56—30)

This invention relates to an improved cotton picker.

An object of this invention is to provide an improved picker for cotton which is constructed as an attachment for tractors so as to provide a relatively inexpensive machine which will effectively remove the cotton from the plant.

Another object of this invention is to provide a cotton picker which may be mounted on the front of a tractor and connected with the power take-off.

A further object of this invention is to provide a cotton picker which can be readily used as a separate unit where a tractor is not available.

A further object of this invention is to provide a cotton picker which will separate the cotton fibers from the leaves and branches so that the cotton discharged into the receiver or cotton wagon will be in a relatively clean condition.

A further object of this invention is to provide a cotton picker which can be easily adjusted with respect to the ground or the growth of the plants so as to effectively clean the cotton from the entire plant.

With the above and other objects in view, my invention consists in the arrangement, combination and details of construction disclosed in the drawings and specification, and then more particularly pointed out in the appended claims.

In the drawings—

Figure 1 is a detail side elevation of a cotton picker constructed according to an embodiment of this invention, Figure 2 is a plan view of the device, Figure 3 is an enlarged sectional view taken on the line 3—3 of Figure 2, Figure 4 is a sectional view taken on the line 4—4 of Figure 3, Figure 5 is a sectional view of the device taken on the line 5—5 of Figure 4, Figure 6 is a fragmentary sectional view taken on the line 6—6 of Figure 1, Figure 7 is an enlarged fragmentary sectional view taken on the line 7—7 of Figure 6, Figure 8 is an enlarged fragmentary sectional view taken on the line 8—8 of Figure 4, Figure 9 is an enlarged fragmentary sectional view taken on the line 9—9 of Figure 3, Figure 10 is an enlarged fragmentary sectional view taken on the line 10—10 of Figure 2, Figure 11 is a fragmentary sectional view taken on the line 11—11 of Figure 3.

Referring to the drawings, the numerals 15 and 16 designate generally a pair of confronting housings which are of like construction and the details of construction of one of these housings will apply equally as well to the other housing.

The housing 15 is formed of a vertical outer wall 17 having an obtusely angled forward wall portion 18 and also includes an inner vertical wall 19 formed with an opening 20, and an outwardly inclined forward wall member 21, which with the forward wall member of housing 16 forms a forwardly divergent entrance 22.

The housing 15 also includes a rear wall 23 and a bottom wall 24. A vertically disposed shaft 25 is journalled at its lower end in a bearing 26 carried by the bottom wall 24, and the shaft 25 extends upwardly through the top wall 27 of housing 15 and is journalled in an upper bearing 28.

A plurality of toothed picker wheels 29 are fixed in vertically spaced apart relation to shaft 25 and are spaced apart by means of spacer sleeves 30. The picker wheels 29 project inwardly into the space 31 between the parellel inner walls 19 of the two housings 15 and 16 so as to contact with the plants passing through the space 31.

A plurality of horizontally disposed guard bars 32 are secured across the opening 20, being disposed between pairs of picker wheels 29. These guard bars 32 provide a means whereby the branches, leaves, or the like will be held against movement inwardly of the housing 15 as the wheels 29 rotate.

A second vertically disposed brush shaft 33 is journalled in housing 15, being rotatably mounted at its lower end in a lower bearing 34, and rotatably disposed at its upper end through an upper bearing 35. The shaft 33 has fixed thereon a brush 36 which rotates in the same direction as the picker wheels 29, but at a faster rate so as to remove the cotton from the teeth of the picker wheels 29.

A vertically disposed suction manifold 37 is disposed within the housing 15, having an opening 38 confronting the meeting point between the picker wheels 29 and the brush 36. The manifold 37 extends upwardly through the top wall 27 and is connected with an L 39 which is connected to the suction side of a suction blower fan 40 mounted on the top wall 27. The suction blower 40 includes a discharge member 41 which extends rearwardly and is adapted to be connected to a receiver which may be positioned at the rear of the tractor T.

The two housings 15 and 16 are fixedly connected together by means of a pair of connecting bars 42 and 43 which are fixed by fastening means 44 and 45 to the top walls 27 of the housings 15 and 16. Each housing is provided with a traction wheel 46 carried by a vertically adjustable bracket or bar 47. The bar 47 is mounted in a channeled guide 48 fixed to the outer wall 17, and a set screw 49 secures the bar 47 in vertically adjusted position. The adjustment of the bar 47 will provide for adjustment of the housing 15 relative to the ground and the plants in the row.

Each housing is provided at the rear thereof with a pair of rearwardly projecting lugs 50 which are adapted to be connected by fastening means 51 to a horizontally disposed bar 52 carried by a pair of rock levers 53. The rock levers 53 are extended toward the rear of the tractor T and form a part of the conventional construction of the tractor. The bars or levers 53 are adapted to be raised or lowered by means of cables 54 which are provided on the tractor.

The picker wheels and the brushes are adapted to be rotated from the power take-off of the tractor T, and the picker wheels and the brushes of the two housings 15 and 16 are operatively connected together as will be hereinafter described.

The upper end of shaft 25 has a pulley 55 fixed thereon and the upper end of brush shaft 33 has a lower pulley 56 mounted thereon which is smaller in diameter than pulley 55. A crossed belt 57 is trained over the pulleys 55 and 56. A relatively large pulley 58 is also mounted on shaft 33 and a small pulley 59 is mounted on the fan blade shaft 60. A belt 61 is trained about the pulleys 58 and 59. An intermediate pulley 62 is mounted on each brush shaft 33 and a crossed belt 63 is trained about the two intermediate pulleys 62 so that the picker wheels and brushes of the two housings 15 and 16 will operate from one of the brush shafts 33.

A bevel gear 64 is mounted on the upper end of one of the brush shafts 33 and a second bevel gear 65 is mounted on a stub shaft 66 which is journalled in a bearing 67. The bearing 67 is carried by an L-shaped support 68 which includes a bearing 69 engaging about the upper portion of shaft 33 below bevel gear 64. A drive shaft 70 is connected with stub shaft 66 by means of a universal connection 71. The drive shaft 70 is adapted to be extended rearwardly to the power take-off of the tractor T.

In the use and operation of this picker, the two connected together housings 15 and 16 are secured to the push bar 52 which is carried by the levers 53 of the tractor T. The housings 15 and 16 are adjusted relative to the ground by the wheel carrying bars 47 and the housings 15 and 16 are disposed with the bottom walls 24 thereof substantially parallel with the ground by adjustment of the levers 53. The tractor T is then moved forwardly along the row of cotton plants with the plants entering the mouth or entrance 22. The picker wheels 29 will contact the cotton on the branches of the plant and move the cotton inwardly of the housings 15 and 16. The brushes 36 which rotate at a speed greater than the picker wheels 29 will remove the cotton from the picker wheels and the cotton removed from the wheels by the brushes 36 will be sucked into the suction manifolds 37. The suction blowers 40 will draw the cotton upwardly in the manifolds 37 and discharge the cotton from the discharge nipples 41 into a conveyor tube and then into the receiver (not shown) which will be disposed at the rear of the tractor T. The guard bars 32 positioned between the picker wheels 29 will prevent any branches or leaves from being drawn into the housings 15 and 16.

While the picker structure hereinbefore described is shown as being connected with a tractor and the power take-off of the tractor, in the event a tractor is not available the drive shaft 70 may be operated from a power unit which may be mounted at the rear of the housings 15 and 16 and the picker structure moved over the ground by animals which may be connected either to the front or to the rear picker structure.

I do not mean to confine myself to the exact details of construction herein disclosed, but claim all variations falling within the purview of the appended claims.

What I claim is—

1. A cotton picker comprising a pair of upright housings, a pair of connecting bars at the tops of said housings securing said housings together in spaced parallel relation, each housing including an inner wall diverging forwardly, each inner wall having an opening adjacent the forward end thereof, a vertical picker wheel shaft rotatably carried by each housing, a plurality of spaced toothed picker wheels fixed to each picker wheel shaft, said wheels projecting through said openings, horizontal guard bars fixed to said inner wall across said inner opening and disposed between pairs of said picker wheels, a brush rotatably disposed in each housing and contacting said wheels for removing the cotton from the latter, bearings mounting said brushes in vertical position in said housing, a vertical suction manifold in each housing having an intake opening confronting the junction between said wheels and said brush, a suction member connected with said manifold, and a source of power, vertical drive shafts carried by said brushes, and mechanical connections between said source of power, said drive shaft and said picker wheel shaft for continuously rotating said brushes and said picker wheels.

2. A cotton picker comprising a pair of upright housings, a pair of connecting bars at the tops of said housings securing said housings together in spaced parallel relation, each housing including an inner wall diverging forwardly, each inner wall having an opening adjacent the forward end thereof, a vertical picker wheel shaft rotatably carried by each housing, a plurality of spaced toothed picker wheels fixed to each picker wheel shaft, said wheels projecting through said openings, horizontal guard bars fixed to said inner wall across said inner opening and disposed between pairs of said picker wheels, a brush rotatably disposed in each housing and contacting said wheels for removing the cotton from the latter, bearings mounting said brushes in vertical position in said housing, a vertical suction manifold in each housing having an intake opening confronting the junction between said wheels and said brush, a suction member connected with said manifold, a source of power, vertical drive shafts carried by said brushes, and mechanical connections between said source of power, said drive shaft and said picker wheel shaft for simultaneously rotating said brushes and said picker wheels, a traction wheel for each housing, an axle fixed to a side of each housing, and a traction wheel mounted on each axle.

3. A cotton picker comprising a pair of upright housings, a pair of connecting bars at the tops of said housings securing said housings together in spaced parallel relation, each housing including an inner wall diverging forwardly, each inner wall having an opening adjacent the forward end thereof, a vertical picker wheel shaft rotatably carried by each housing, a plurality of spaced toothed picker wheels fixed to each picker wheel shaft, said wheels projecting through said openings, horizontal guard bars fixed to said inner wall across said inner opening and disposed between pairs of said picker wheels, a brush rotatably disposed in each housing and contacting said wheels for removing the cotton from the latter, bearings mounting said brushes in vertical position in said housing, a vertical suction manifold in each housing having an intake opening confronting the junction between said wheels and said brush, a suction member connected with said manifold, a source of power, vertical drive shafts carried by said brush, and mechanical connections between said source of power, said drive shaft and said picker wheel shaft for simultaneously rotating said brushes and said picker wheels, a traction wheel for each housing, a vertical guide fixed to the outer side of each housing, a slide engaging in said guide, an axle carried by each slide, a traction wheel carried by each axle and means adjustably securing said slide in said guide.

4. A cotton picker comprising a pair of vertically disposed housings, a pair of connecting bars at the tops of said housings securing said housings together in spaced parallel relation, said housings being flared at their forward ends to form an entrance for the plants, said housings having confronting openings adjacent the forward ends thereof, horizontal grill bars secured across each opening, a rotatable toothed picker mounted in each housing projecting partly through said grill bars, a brush rotatable in each housing engaging said picker means for removing the cotton from the latter, a suction manifold in each housing having an elongated opening confronting the junction between said picker means and said brush, a suction source connected to said manifold, and a source of power connected to said picker and said brush for simultaneously rotating the same.

CLARK WALTER TOOLE.

References Cited in the file of this patent

UNITED STATES PATENTS

| Number | Name | Date |
| --- | --- | --- |
| 2,387,004 | Berry | Oct. 16, 1945 |
| 2,473,315 | Wallace | June 14, 1949 |
| 2,484,524 | Nisbet, Sr. | Oct. 11, 1949 |
| 2,513,259 | Walker, Jr. | June 27, 1950 |